Jan. 5, 1943.  M. K. BERNHARDT  2,307,663
VEHICLE TIRE LOCK
Filed April 14, 1942  3 Sheets-Sheet 1
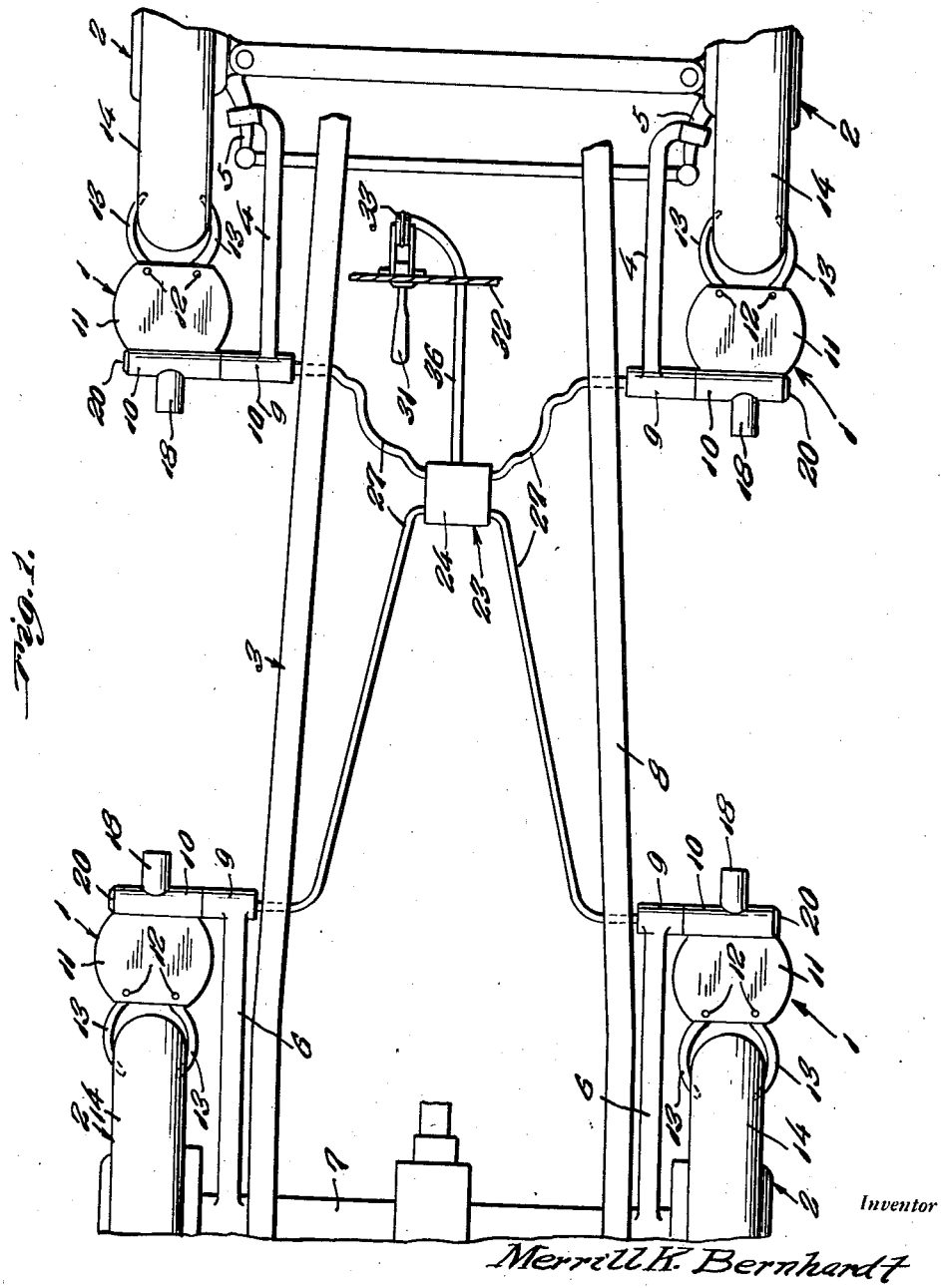
Inventor
Merrill K. Bernhardt
By Clarence A. O'Brien
and Harvey B. Jacobson, Attorneys

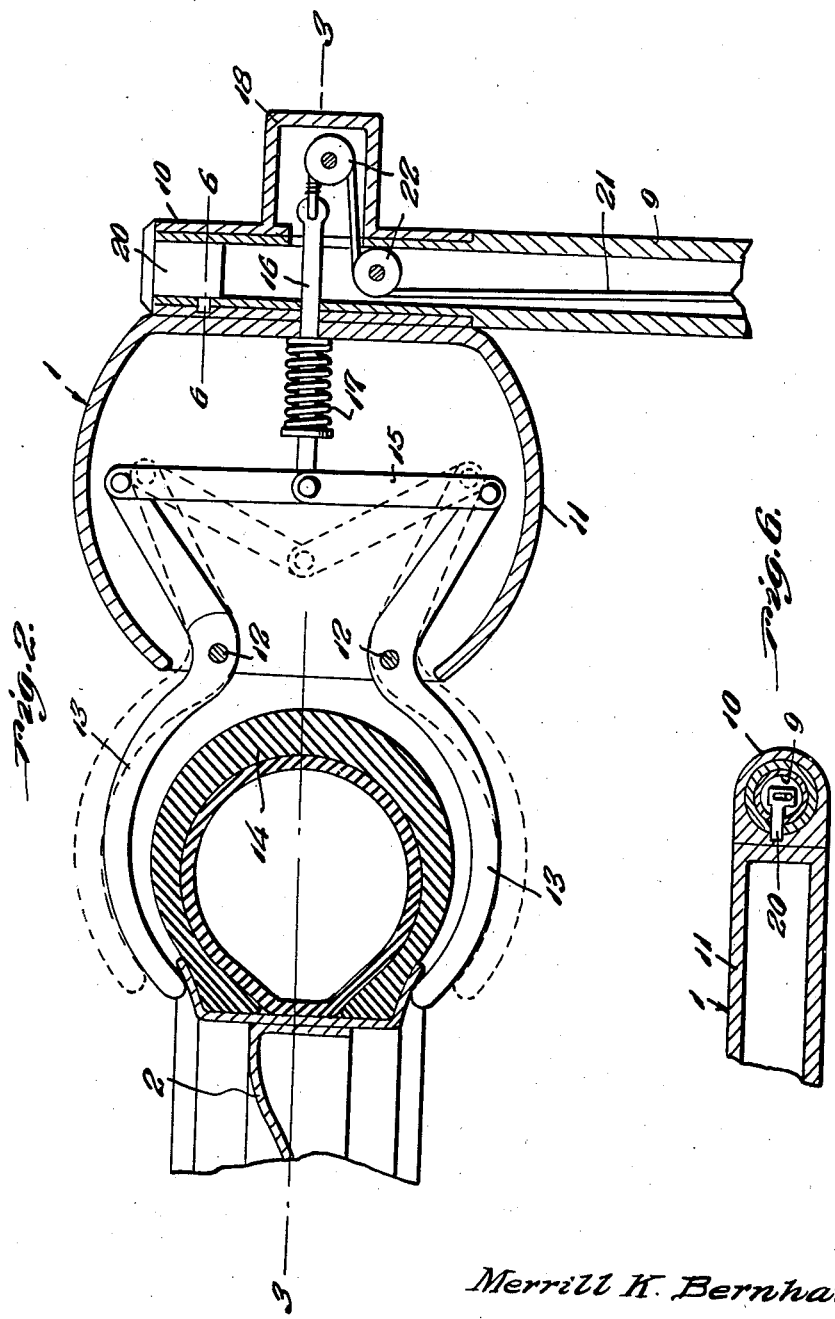

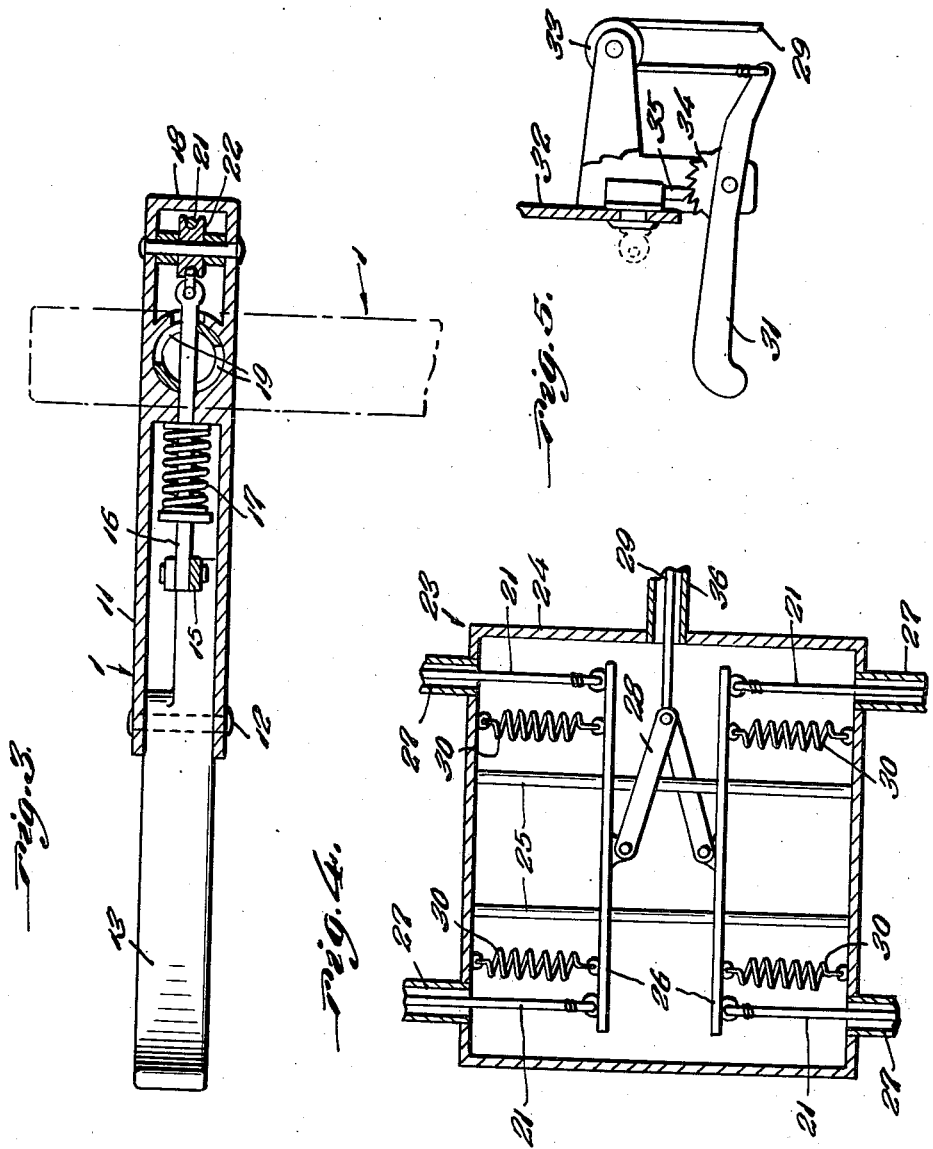

Patented Jan. 5, 1943

2,307,663

UNITED STATES PATENT OFFICE 2,307,663

VEHICLE TIRE LOCK

Merrill K. Bernhardt, South Bend, Ind.

Application April 14, 1942, Serial No. 438,953

3 Claims. (Cl. 188—10)

The present invention relates to new and useful improvements in vehicle tire locks, and has for its primary object to provide, in a manner as hereinafter set forth, a novel apparatus for positively preventing the theft of tires, also the wheels, of motor vehicles, trailers, et cetera.

Another very important object of the invention is to provide a locking apparatus of the aforementioned character for all four tires of the vehicle and which is conveniently operable from the driver's seat of said vehicle.

Still another very important object of the invention is to provide a locking apparatus of the character described which will prevent the vehicle from being moved by unauthorized persons.

Other objects of the invention are to provide a vehicle tire lock of the character set forth which will be comparatively simple in construction, strong, durable, highly efficient and reliable in use, compact, and which may be manufactured and installed at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a top plan view of a locking apparatus constructed in accordance with the present invention.

Figure 2 is a view in horizontal section through one of the locking units.

Figure 3 is a view in vertical longitudinal section, taken substantially on the line 3—3 of Figure 2.

Figure 4 is a view in horizontal section through the equalizer.

Figure 5 is a view in side elevation of the operating lever and lock therefor.

Figure 6 is a fragmentary view in section, taken substantially on the line 6—6 of Figure 2.

Referring now to the drawings in detail, it will be seen that the embodiment of the invention which has been illustrated comprises a plurality of locking units which are designated generally by the reference numeral 1, said units being provided adjacent each of the wheels 2 of a vehicle 3. It will be observed that the rear units 1 are located forwardly of the rear wheels of the vehicle and that the frront units 1 are located rearwardly of the front wheels of said vehicle. In the arrangement shown, the front units are mounted through the medium of suitable supports 4 on the members 5 of the steering apparatus of the vehicle in order that said front units may move laterally in unison with the wheels as they are steered. Suitable supports 6 mount the rear units on the rear axle housings 7 of the vehicle.

In the embodiment shown, each of the units 1 includes a transverse, stationary tubular supporting arm 9 which is fixed on its support. The outer portion of the tubular arm 9 is externally reduced and journaled thereon is a sleeve 10. Fixed on the sleeve 10 is a housing 11. Pivotally mounted at intermediate points, as at 12, in the housing 11 and protruding from an opening therein is a pair of jaws 13. The jaws 13 are adapted to receive therebetween and to clamp the wheels 2 of the vehicle with the tires 14 thereon.

A toggle 15 in the housing 11 opens and closes the jaws 13 in unison. An operating rod 16 is connected to the links of the toggle 15. In Figure 2 of the drawings, the jaws 13 are shown in closed position. A coil spring 17 in the housing 11 is operatively connected to the rod 16 for opening the jaws 13. This open position of the jaws 13 is indicated in dotted lines in Figure 2 of the drawings.

Projecting from the sleeve 10 at an intermediate point and communicating therewith is a housing 18. The rod 16 extends slidably through the housing 11, the sleeve 10 and the tubular arm 9 into the housing 18. As illustrated to advantage in Figure 3 of the drawings, circumferential slots 19 in the tubular arm 9 accommodate the rod 16 and permit rotation of the sleeve 10 with said rod therein. A key actuated lock 20 in the outer end portion of the tubular arm 9 releasably secures the sleeve 10 against rotation with the unit 1 projecting horizontally. A cable 21 passes through the tubular arm 9 and has one end connected to the rod 16 for retracting said rod against the tension of the coil spring 17 in a manner to close the jaws 13. The cable 21 is trained over suitable pulleys 22 which are provided therefor.

Mounted beneath the vehicle 3 is an equalizing unit 23. The equalizing unit 23 includes a casing 24 having mounted transversely therein a pair of spaced, parallel rods 25. A pair of flat, metallic bars 26 are slidably and loosely mounted for operation on the rods 25. Flexible conduits 27 extend from the casing 24 to the inner ends of the tubular arms 9. The cables pass through the flexible conduits 27 and have their other ends connected to the end portions of the bars 26. The links of a toggle 28 are pivotally connected to the bars 26 at intermediate points. A cable 29 has one end connected to the toggle 28 for actuating the bars 26 in a direction to close the jaws 13. Return springs 30 are connected to the bars 26.

The other end of the cable 29 is connected to one end portion of a hand lever 31 which is pivotally mounted on the instrument panel 32 of the vehicle. The cable 29 is trained over a pulley 33. The hand lever 31 is provided with a ratchet 34 with which a suitable key actuated lock 35 is engageable for locking the jaws 13 in closed position. A conduit 36 is provided for the cable 29.

It is thought that the manner in which the apparatus functions will be readily apparent from a consideration of the foregoing. Briefly, when it is desired to close the jaws 13, on all of the wheels of the vehicle, the operator simply actuates the hand lever 31 in a direction to pull the bars 26 toward each other against the tension of the springs 30 through the medium of the cable 29 and the toggle 28, the lock 35 automatically securing said hand lever. Movement of the bars 26 toward each other actuates the rods 16 through the medium of the cables 21 for opening the toggles 15, thereby closing the jaws 13. When the handle 31 is unlocked, the springs 30 and 17 return the jaws 13 to open position. When it is desired to change a tire or a wheel, the sleeve 10 of the adjacent unit 1 is unlocked at 20 from its supporting arm 9 for permitting said unit 1 to swing downwardly to an out-of-the-way position.

It is believed that the many advantages of a vehicle tire lock constructed in accordance with the present invention will be readily understood, and although a preferred embodiment of the apparatus is as illustrated and described, it is to be understood that changes in the details of construction and in the combination and arrangement of parts may be resorted to which will fall within the scope of the invention as claimed.

What is claimed is:

1. A vehicle tire lock of the character described comprising tubular supporting arms mounted transversely on the vehicle adjacent the wheels thereof, housings mounted on said arms, pairs of coacting clamping jaws pivotally mounted in the housings and protruding therefrom for clamping the tires of the vehicle therebetween, toggles in the housings operatively connected to the pairs of jaws, rods operatively connected to said toggles and extending slidably into the tubular arms, springs in the housings operatively connected to the rods for opening the jaws, cables in the tubular arms connected to the rods for opening the jaws against the tension of said springs, and means for actuating said cables.

2. A vehicle tire lock of the character described comprising a plurality of tubular arms mounted transversely on the vehicle adjacent the wheels thereof, sleeves journaled on said arms, housings fixed on said sleeves, pairs of coacting jaws pivotally mounted in the housings and protruding therefrom for clamping the tires of the vehicle therebetween, cables in the tubular arms, means operatively connecting said cables to the jaws for closing said jaws, and means for releasably locking the sleeves against rotation on the tubular arms.

3. A vehicle tire lock of the character described comprising pairs of jaws mounted on the vehicle and adapted to grip the tires of said vehicle, a casing mounted on the vehicle, a pair of rods in said casing, a pair of bars slidably mounted on said rods, cables connecting said bars to the pairs of jaws for closing said jaws, a toggle connected to the bars, a hand lever, means operatively connecting said hand lever to the toggle for actuating the bars in a direction to close the jaws, and return springs in the casing connected to the bars.

MERRILL K. BERNHARDT.